(12) United States Patent
Staskal

(10) Patent No.: US 7,374,210 B2
(45) Date of Patent: May 20, 2008

(54) HYDRO PENETRATION PREVENTION SLEEVE

(75) Inventor: Jeffery Gene Staskal, 2144 SE. 8th Ave., Cape Coral, FL (US) 33990

(73) Assignee: Jeffery Gene Staskal, Beloit, WI (US)

( * ) Notice: Subject to any disclaimer, the term of this patent is extended or adjusted under 35 U.S.C. 154(b) by 0 days.

(21) Appl. No.: 11/582,240

(22) Filed: Oct. 17, 2006

(65) Prior Publication Data

US 2008/0088128 A1   Apr. 17, 2008

(51) Int. Cl.
*F16L 49/00* (2006.01)
(52) U.S. Cl. .................. 285/230; 285/141.1; 285/194; 285/208
(58) Field of Classification Search ............. 285/141.1, 285/142.1, 194, 196, 208, 230; 52/220.8; 249/39
See application file for complete search history.

(56) References Cited

U.S. PATENT DOCUMENTS

| | | | | |
|---|---|---|---|---|
| 2,451,070 A | * | 10/1948 | Chamberlain | 277/617 |
| 2,537,659 A | * | 1/1951 | Eisner et al. | 277/625 |
| 4,186,931 A | * | 2/1980 | Anderson | 277/603 |
| 4,282,627 A | * | 8/1981 | Downing | 174/153 G |
| 4,384,566 A | * | 5/1983 | Smith | 126/513 |
| 4,394,025 A | * | 7/1983 | Anderson | 277/617 |
| 4,951,914 A | * | 8/1990 | Meyers et al. | 249/11 |
| 5,456,050 A | * | 10/1995 | Ward | 52/220.8 |
| 5,529,312 A | * | 6/1996 | Skinner et al. | 277/604 |
| 5,711,536 A | * | 1/1998 | Meyers | 277/606 |
| 5,722,699 A | * | 3/1998 | Brancher | 285/142.1 |
| 2003/0019163 A1 | * | 1/2003 | Dittel | 52/20 |

\* cited by examiner

*Primary Examiner*—Aaron Dunwoody
*Assistant Examiner*—Fannie C Kee

(57) ABSTRACT

A hydro concrete to pipe sealing arrangement consisting of a main sealing sleeve having a first end and a second end, the main sealing sleeve consisting of two halves which interfit with each other to accommodate dimension variations during forming of a concrete casing wall; a rubber sleeve having a first end and a second end, the rubber sleeve being located on an interior of the main sealing sleeve wherein the rubber sleeve is entirely surrounded by the main sealing sleeve; the rubber sleeve having rings located on an interior surface which face towards the first end of the rubber sleeve, wherein the rings will slant in the same direction as a pipe being inserted, the rings being compressed between the pipe and the rubber sleeve; at least two hydro penetration stopping rings formed on an exterior surface of the main sealing sleeve and extending radially opposite from the rubber sleeve; at least two retainer rings embedded within an interior of the rubber sleeve at the first end and the second end of the rubber sleeve, and seals located at the first end and the second end of the main sealing sleeve to create a seal between the pipe to be inserted and the concrete casing wall.

3 Claims, 4 Drawing Sheets

HYDRO PENETRATION PREVENTION SLEEVE

BACKGROUND OF THE INVENTION

Any building that has a below ground opening such as a basement, will encounter ground water that may penetrate through the basement wall even if the wall is made of concrete. Concrete does have some kind of porous structure. The penetration may be stopped if the outside of the basement wall is coated with a substance like tar or similar materials. The water penetration problem is aggravated when a pipe is passing through the wail. Such a pipe can be a sewer pipe which must be placed through the basement wall at a height somewhat above the location of the main sewer pipe which is located away from the building or house. This arrangement will enable the sewage to flow by gravity from the building into the main sewage pipe. However, the pipe exiting from the basement wall is not water proofed in any way against the influx of ground water into the basement of the building. Various sleeves and seals are known to prevent any ground water from entering into the basement of a building. However, of what is known to the applicant, none are successful to prevent the above known problem.

BRIEF DESCRIPTION OF THE INVENTION

The inventive concept involves a sleeve of PVC consisting of two halves that will fit within each other to preset various lengths depending on the thickness of the walls where it is being used. Once a proper length is obtained, the two halves are glued to each other after proper dimensions have been obtained when being inserted into a casing prior to casting or pouring the concrete therein. The sleeve has further attached thereto an interior rubber seal in the form of a tube that is attached to the sleeve by way of a hook and nose arrangement at their respective ends. The interior rubber seal tube has protruding therefrom a multiple of rings with their outer circumference being directed toward the interior of the main sleeve. However the direction of the multiple of the rings is directed in a slant toward the direction of a pipe that eventually is inserted therein. The reason for this will be explained below. Each of the sleeves that make up the main sealing sleeve have extended therefrom in a radial direction hydro penetration prevention stops that will be embedded in the concrete once the concrete casting is finished. Also, once the concrete casting is finished, an exterior grommet seal is attached between a pipe and the outer and inner wall of the concrete. This seal has an exterior retainer collar.

In another embodiment of the invention there is shown a sealing arrangement that is to be used on an already existing pipe in a concrete wall. This arrangement consists of an exterior grommet seal that has a flange thereon. This seal is made of hard rubber, yet, it remains flexible so that the grommet seal can be slipped over the existing pipe by way of a tangential cut that can be opened so that it can be slipped over the existing pipe but will seal again once it is in place around the pipe. The grommet seal is held in place and against the concrete wall by way of a retainer plate which is held in place by screws that penetrate through the plate and into the concrete wall. Additionally, the flange on the grommet seal is completely sealed by way of a hose clamp which will compress the flange and the previously tangential cut in to a complete sealing condition.

BRIEF DESCRIPTION OF THE DRAWINGS

FIG. 2A is a cross section along line A-A through the element of FIG. 2;

DETAILED DESCRIPTION OF THE INVENTION

Figure 1:
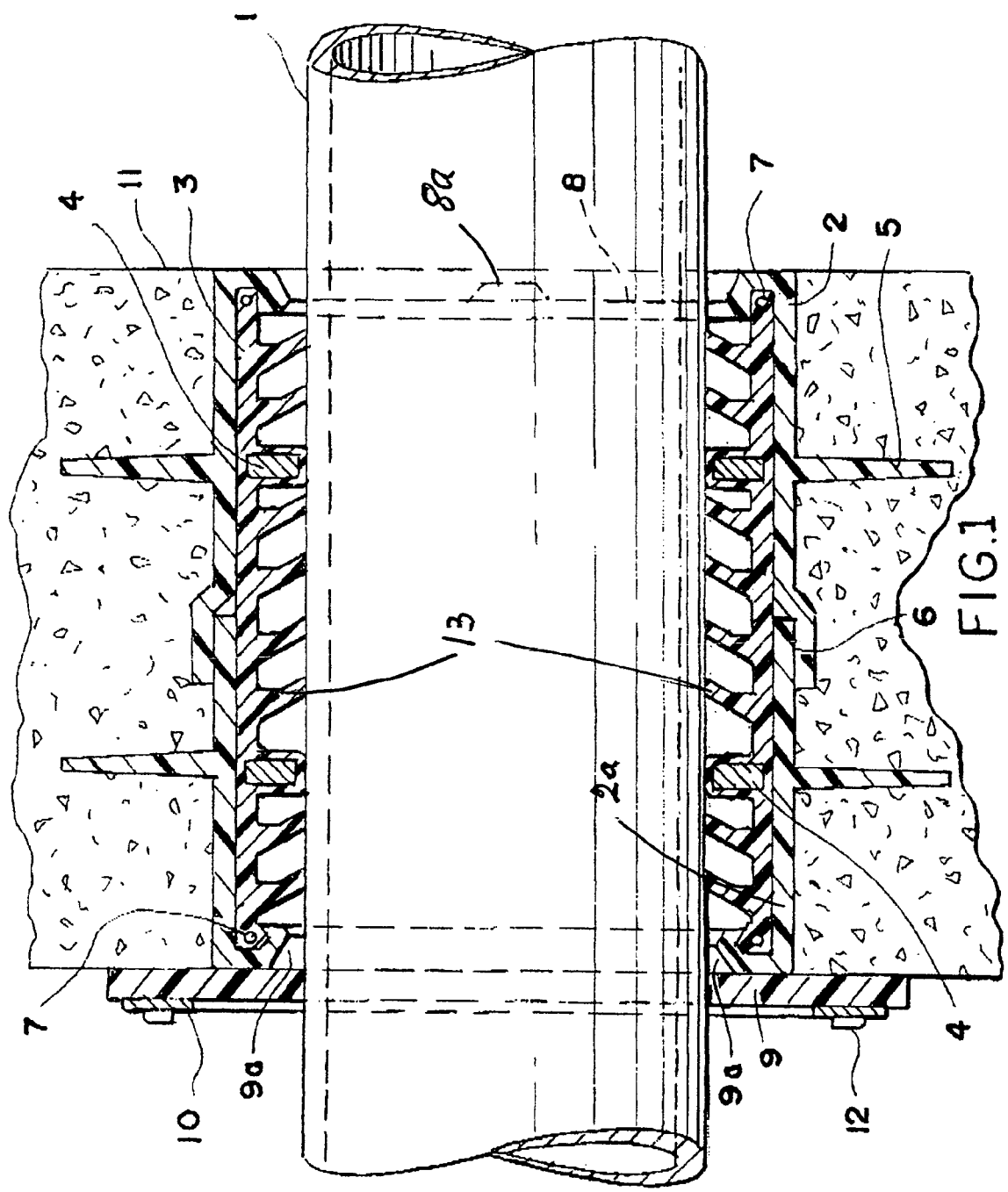
FIG. 1 is a cross section through the concrete wall and pipe arrangement.

FIG. 1 shows the present invention in a cross sectional view. At 1 is shown a pipe that will eventually be installed in the basic sealing unit 2. The basic sealing unit 1 consists of two half sections 2 and 2a which will slip into each at 6 and will be glued together at that point when proper dimensions of 8 to 12 inches have obtained at this point of construction. Different wall thicknesses will require different lengths The basic sealing unit has included therein an interior rubber seal 3 which is supported within the basic sealing unit 2 by way of a cradle 4. The interior rubber seal 3 further has embedded therein retainer or reinforcing rings 7 which are designed to keep the circular shape of the interior rubber seal 3 before, during and after the installation of the interior rubber seal. The cradle 4 is designed to keep a concentricity between the pipe 1 and the interior rubber seal 3 during installation.

On the outside of the basic sealing unit 2 there are provided extended PVC rings 5 which act as a penetration stop of water through the wall and past the basic sealing unit.

The basic interior rubber seal 3 further includes hydro prevention rings 13 which are slanted in the direction of the pipe 1 insertion so that their slant direction contributes to a pressure sealing because of the deflection pressure induced when pushing the pipe 1 through the interior rubber seal.

Figure 2:
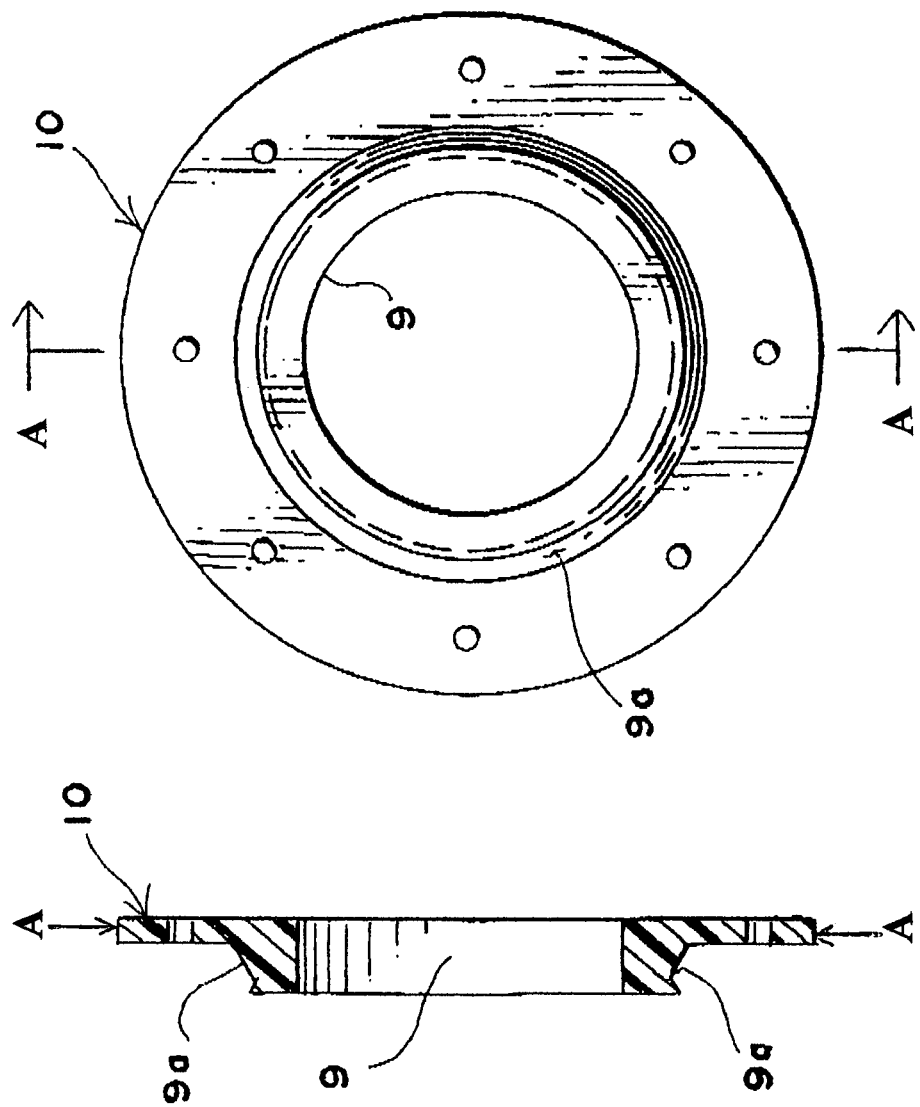
FIG. 2 shows an element of the sealing arrangement of FIG. 1.

The outer concrete wall is sealed against any leakage past the pipe 1 by way of using an exterior grommet seal 9 (FIG. 2) which has a nose 9a which when pushed (forced) into the basic sealing unit 2 will lock into the basic sealing unit 2 by way of the hook and nose arrangement 9 and 9a. The grommet seal 9 is pressed against the concrete wall 11 by way of an exterior retainer plate 10 which is fastened and forced against the concrete wall 11 by way of the fastening and anchoring screws 12.

Both ends of the basic sealing unit 2 are sealed against concrete leaking into the same by way of the knock-out plate 8 which has a thinned area 8a for a tool to be applied to easily knock-out the plate.

Figure 3:
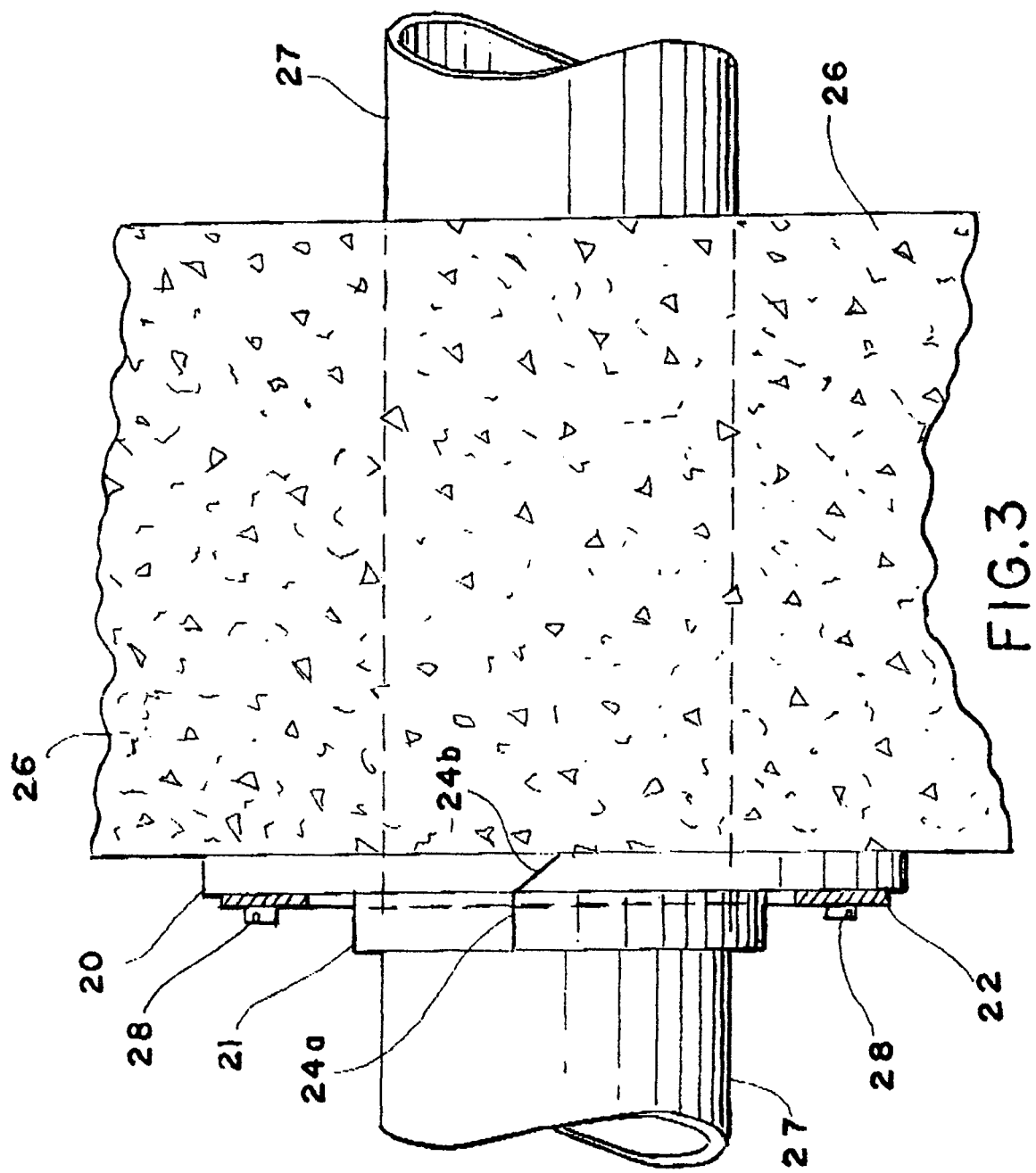
FIG. 3 is a side view of a different embodiment of the invention which is directed to a retrofit of a pipe in a concrete wall.
Figure 4:
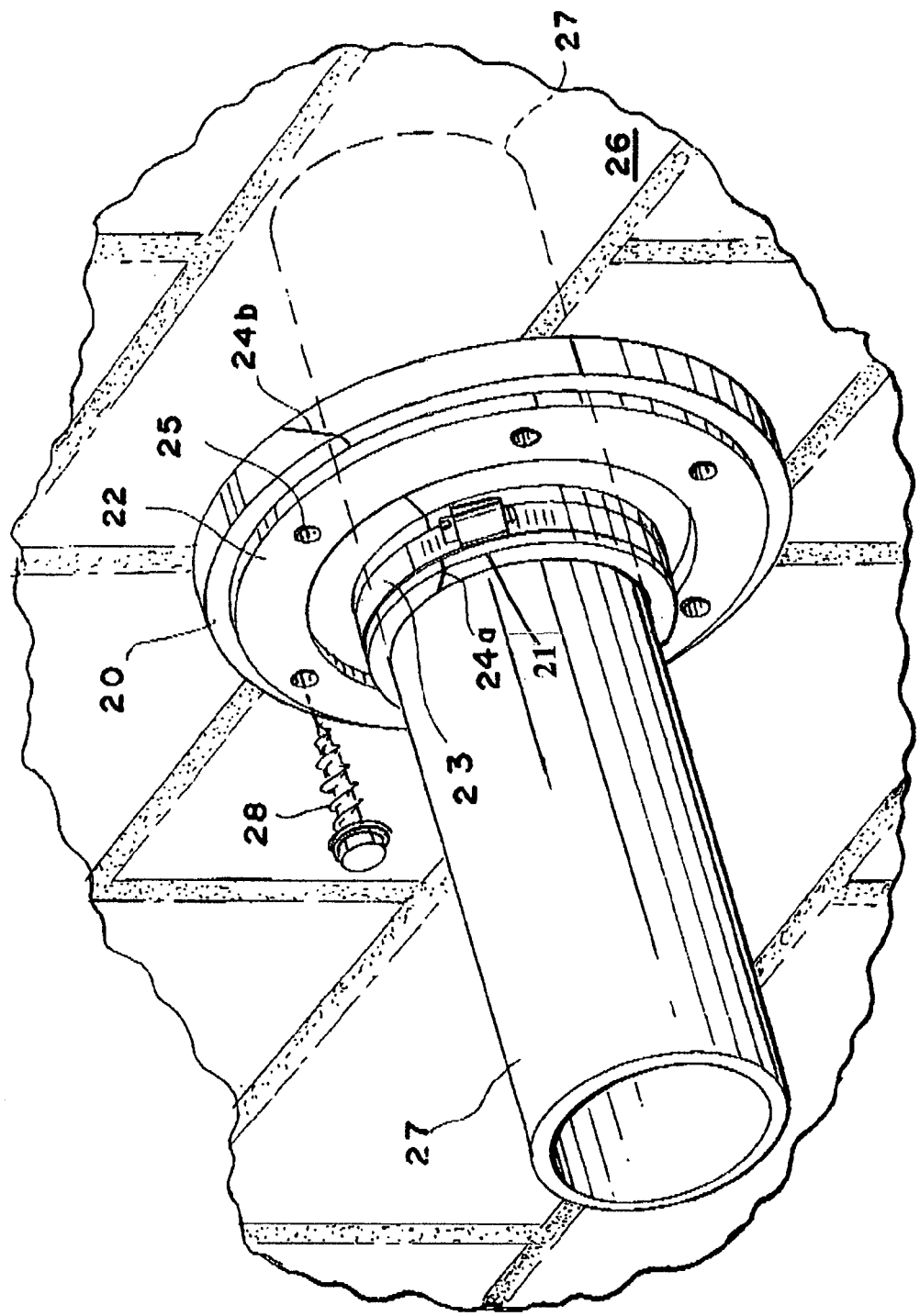
FIG. 4 is a perspective view of the different embodiment of FIG. 3.

FIGS. 3 and 4 illustrates a different embodiment of the invention which is considered a retrofit situation for an existing pipe 27 in a concrete wall 26. As in the previous embodiment there is an exterior grommet seal 20 having a tangential cut 24b therein. This enables a person to install the grommet seal 20 by simply bending the seal in two different directions to obtain an opening to enable the opening to be slipped over the circumference of an existing pipe. The grommet seal 20 has a flange 21 thereon which also has a tangential cut 24a therein so that that it may be opened with the cut 24b to be able to be slipped over an existing pipe 27. The tangential cuts 24a and 24b are in the same direction so that the grommet seal 20 can be opened to accommodate the pipe circumference when installing the same around the pipe 27. There is an exterior retainer plate 22 which is installed in such a manner so that it presses against the exterior grommet seal 20 by way of screws 28 which are screwed into the concrete by way of holes 25 with proper pressure to make the seal leak proof. The flange 21 is also compressed by way of a hose pressure clamp 23 which will compress the flange 21 and the tangential cut 24a to render both of them to be leak proof.

What I claim is:

1. A hydro concrete to pipe sealing arrangement consisting of:
- a main sealing sleeve having a first end and a second end, said main sealing sleeve consisting of two halves which interfit with each other to accommodate dimension variations during forming of a concrete casing wall;
- a rubber sleeve having a first end and a second end, said rubber sleeve being located on an interior of said main sealing sleeve wherein said rubber sleeve is entirely surrounded by said main sealing sleeve;
- said rubber sleeve having rings located on an interior surface which face towards said first end of said rubber sleeve, wherein said rings will slant in the same direction as a pipe being inserted, said rings being compressed between the pipe and the rubber sleeve;
- at least two hydro penetration stopping rings formed on an exterior surface of said main sealing sleeve and extending radially opposite from said rubber sleeve;
- at least two retainer rings embedded within an interior of said rubber sleeve at said first end and said second end of said rubber sleeve, and
- seals located at said first end and said second end of said main sealing sleeve to create a seal between the pipe to be inserted and the concrete casing wall.

2. The pipe sealing arrangement of claim 1, wherein one of said seals is a knock-out plate.

3. The pipe sealing arrangement of claim 1, wherein one of said seals is a compression fitting plate made of hard rubber.

* * * * *